US007959057B2

(12) United States Patent
Criqui

(10) Patent No.: US 7,959,057 B2
(45) Date of Patent: Jun. 14, 2011

(54) TOOL AND METHOD FOR ASSEMBLING METAL PARTS BY IMPACTING WITH THE AID OF A MAGNETIC FORCE USING TWO ELECTROMAGNETIC COILS MOVABLE WITH RESPECT TO EACH OTHER

(75) Inventor: Bernard Criqui, Suresnes (FR)

(73) Assignee: Renault S.A.S., Boulogne-Billancourt (FR)

( * ) Notice: Subject to any disclaimer, the term of this patent is extended or adjusted under 35 U.S.C. 154(b) by 591 days.

(21) Appl. No.: 11/910,365

(22) PCT Filed: Mar. 28, 2006

(86) PCT No.: PCT/FR2006/050266
§ 371 (c)(1),
(2), (4) Date: May 9, 2008

(87) PCT Pub. No.: WO2006/103367
PCT Pub. Date: Oct. 5, 2006

(65) Prior Publication Data
US 2009/0050676 A1 Feb. 26, 2009

(30) Foreign Application Priority Data
Mar. 31, 2005 (FR) ...................................... 05 03165

(51) Int. Cl.
*B23K 20/00* (2006.01)
*B23K 37/00* (2006.01)
(52) U.S. Cl. .... 228/115; 228/3.1; 228/234.1; 228/262.4
(58) Field of Classification Search ........................ None
See application file for complete search history.

(56) References Cited

U.S. PATENT DOCUMENTS

| 2,961,528 | A | * | 11/1960 | Dixon | 219/98 |
| 3,100,831 | A | * | 8/1963 | Wakeley | 219/86.32 |
| 3,364,333 | A | * | 1/1968 | Kiyoshi | 219/91.2 |
| 3,520,049 | A | * | 7/1970 | Dudin et al. | 219/617 |
| RE29,016 | E | * | 10/1976 | Peacock | 219/611 |

(Continued)

FOREIGN PATENT DOCUMENTS
EP 1 053 820 11/2000
(Continued)

OTHER PUBLICATIONS
Derwent-Acc-No. 2006-685083.*

*Primary Examiner* — Kiley Stoner
(74) *Attorney, Agent, or Firm* — Oblon, Spivak, McClelland, Maier & Neustadt, L.L.P.

(57) ABSTRACT

A tool for assembling a part made of a ferromagnetic material with a part made of a paramagnetic material. The tool includes a first tool part including a first abutment and a first electromagnetic coil. The tool also includes a second part including a second abutment, wherein the second part is mechanically assembled with the first part such that the first and second abutments are selectively attracted or repelled with respect to each other. The first electromagnetic coil is used for generating an electromagnetic flux that enables the paramagnetic part to be pushed towards the second abutment and/or the ferromagnetic part to be attracted thereto when the first and/or second part is placed between the first and second abutments.

12 Claims, 1 Drawing Sheet

U.S. PATENT DOCUMENTS

| | | | |
|---|---|---|---|
| 4,238,658 A | 12/1980 | Kalnin et al. | |
| 4,513,188 A * | 4/1985 | Katzenstein | 219/617 |
| 4,842,182 A * | 6/1989 | Szecket | 228/108 |
| 5,442,846 A * | 8/1995 | Snaper | 29/419.2 |
| 5,474,226 A * | 12/1995 | Joseph | 228/112.1 |
| 6,348,670 B2 * | 2/2002 | Kistersky et al. | 219/121.45 |
| 6,389,697 B1 | 5/2002 | Benoit et al. | |
| 6,854,635 B2 * | 2/2005 | Cermak | 228/115 |
| 2002/0003159 A1 * | 1/2002 | Gabbianelli et al. | 228/131 |
| 2002/0108946 A1 * | 8/2002 | Kistersky et al. | 219/617 |
| 2003/0127453 A1 * | 7/2003 | Kichline, Jr. | 219/617 |
| 2003/0226838 A1 * | 12/2003 | Gust | 219/617 |
| 2005/0035178 A1 * | 2/2005 | Martin et al. | 228/107 |
| 2005/0116011 A1 * | 6/2005 | Durand | 228/107 |
| 2005/0205553 A1 * | 9/2005 | Cheng et al. | 219/603 |
| 2006/0032895 A1 * | 2/2006 | Durand et al. | 228/234.1 |
| 2006/0081684 A1 * | 4/2006 | Moore | 228/115 |
| 2006/0131300 A1 * | 6/2006 | Yablochnikov | 219/617 |
| 2006/0185412 A1 * | 8/2006 | Shao et al. | 72/56 |
| 2010/0140328 A1 * | 6/2010 | Olsson | 228/115 |

FOREIGN PATENT DOCUMENTS

| | | |
|---|---|---|
| GB | 2 084 806 | 4/1982 |
| JP | 8 306475 | 11/1996 |
| WO | WO 97/00151 | 1/1997 |

* cited by examiner

TOOL AND METHOD FOR ASSEMBLING METAL PARTS BY IMPACTING WITH THE AID OF A MAGNETIC FORCE USING TWO ELECTROMAGNETIC COILS MOVABLE WITH RESPECT TO EACH OTHER

BACKGROUND

The present invention relates, in a general manner, to the field of assembling metal parts by impacting these parts with the aid of an electromagnetic force.

More particularly, the invention relates to a tool for assembling a part made of ferromagnetic material with a part made of paramagnetic metal material, comprising a first tool portion having a first abutment and a first electromagnetic coil.

In order to assemble metal parts together, methods are known that consist in placing these parts in a strong electromagnetic field so that at least one of the parts sustains a strong acceleration generated by the field and moves rapidly toward the other metal part. The kinetic energy acquired by the moving part is absorbed during the impact between the two metal parts to be assembled. If the energy dissipated during the impact is then sufficient, the crystalline structures of the metal parts are mixed together thereby at least partially creating an assembly between the parts resembling a weld.

This is why many manufacturers of tools for assembling metal parts have developed various solutions aimed at increasing the strength of such assemblies and at reducing the cost of producing these assemblies.

An assembly tool is for example described in patent document WO 97/00151. Parts are placed in an electromagnetic coil and when this coil is supplied the parts tend to deform mechanically thereby creating an adhesion of these parts by the mixture of superficial portions of their crystalline structures. To be assembled, the parts must be positioned in the coil then held in position in the coil. Accordingly, this position is difficult to maintain because the coil hampers access to the parts to be assembled. It is therefore difficult to automate this assembly method for manufacturing in long runs.

BRIEF SUMMARY

Within this context, the object of the present invention is to propose a tool for assembling a part made of ferromagnetic material with a metal part made of paramagnetic material and another method of assembling such parts allowing automation of the assembly and making easier the operations of positioning the parts prior to assembly.

For this purpose, the tool of the invention, furthermore complying with the generic definition given of it by the previously defined preamble, is essentially characterized in that it comprises a second portion having a second abutment, the second portion being mechanically assembled to the first portion in such a way that the first and second abutments can be brought closer to one another or moved further apart from one another selectively, the first electromagnetic coil being suitable for generating an electromagnetic flux such that the part made of paramagnetic material is repelled toward the second abutment and/or that the part made of ferromagnetic material is attracted toward the first abutment, when said part(s) is/are placed between the first and second abutments.

For this same purpose, the invention relates to an assembly method characterized in that:

a part made of ferromagnetic material and a part made of paramagnetic metal material is placed between first and second abutments;

then the first and second abutments are brought closer together so that the part made of paramagnetic material is in contact with the first abutment and with the part made of ferromagnetic material, without touching the second abutment and so that the part made of ferromagnetic material is in contact with the second abutment and with the part made of paramagnetic material, without touching the first abutment;

then, the first and second abutments are moved further from one another and a determined space is created between the parts, the part made of ferromagnetic material being in contact against the second abutment and the part made of paramagnetic material being in contact against the first abutment;

then a first coil is supplied so as to throw and impact the parts against one another, the kinetic energy acquired by at least one of the parts having to be sufficient for the parts to remain assembled together after the impact.

Thanks to the tool and the method according to the invention, the parts to be assembled can be placed between the abutments without being hampered by these abutments since the latter may be moved further apart from one another. Then by bringing the abutments closer to one another, the relative positioning of the part to be assembled is made easier, these abutments allowing a prepositioning of the parts.

In addition, when the first coil is supplied in order to violently throw at least one of the parts in the direction of the other part, at least one of the abutments limits the movements of one of the parts that is then jammed between this abutment and the thrown part thereby forming a kind of vice for compressing one part against the other.

Thanks to the tool and the method of the invention, the maximum amplitude of the throwing movement of one part against the other may be set simply by adjusting the distance between the abutments, this distance determining the space between the parts. By determining the distance between the abutments, it is possible to simply preset the kinetic energy that will be transmitted to the parts when the first coil is supplied. In other words, the maximum energy necessary to assemble the parts may be set simply and substantially repetitively by controlling the distance between the abutments and the electromagnetic power transmitted by the first coil to the part or parts to be assembled.

Being able to set the space between the parts/the amplitude of movement between the parts allows the assembly of the parts to be automated.

The maximum amplitude of movement of one part relative to the other is equal to the distance that exists between the abutments after having moved them apart subtracted from the distance existing between the abutments when the latter clamp the parts against one another.

Accordingly, the maximum amplitude of movement may be defined precisely.

The tool according to the invention may be used for assembling parts of various sizes and shapes because it is not necessary to place the parts to be assembled inside the coil.

In addition to allowing the maximum amplitude of movement of the parts to be set, at least one of the abutments is also used to generate a resistive force to prevent the movement of the part that is impacted by the moving part. For this, the abutments are made of extremely rigid and hard material such as forged steel, which reduces the amount of energy absorbed and dissipated by the abutment at the time of impact. Therefore a large portion of the kinetic energy is directly transmitted to the interface between the parts, without being dissipated by the abutment, making it possible the material of one part to diffuse into the other part.

Thanks to the high level of energy used during the magnetic impulse welding, assembly may be achieved with parts in the solid state, i.e. cold (at the ambient temperature of a body shop) in a very short time and without providing a third material. An energy of impact between the parts of 1 to 10 kJ/cm² may be sufficient to achieve assembly between a paramagnetic material, namely, aluminum and a ferromagnetic material, namely, steel.

It is possible for example to arrange for the second portion to comprise a magnetization means suitable for attracting the part made of ferromagnetic material toward the second abutment when this part is placed between the first and second abutments.

Since the part made of ferromagnetic material is attracted toward the second abutment, the latter tends to remain in contact with the second abutment and to follow its movements. Thanks to this feature, moving the second abutment also moves the part made of ferromagnetic material, thereby making it easier to locate the ferromagnetic part relative to the tool. The fact that the part made of ferromagnetic material is attracted toward the second abutment and remains in contact with it is an advantage at the time of the impact between the parts because the second abutment then exerts a resistive force on the second part allowing an optimal use of the kinetic energy that is mainly used for achieving the assembly.

It is possible for example to arrange for the magnetization means to be a second electromagnetic coil. Therefore, after having brought the abutments closer to one another and before supplying the first coil, this second coil is supplied which constitutes a magnetization means suitable for attracting the part made of ferromagnetic material (placed between the first and second abutments) toward the second abutment.

Ideally, this second coil, when electrically supplied, makes it possible to immobilize the part made of ferromagnetic material relative to the second abutment. This is an advantage for automating the tool and the method of the invention, since the magnetization of the part made of ferromagnetic material is selective and depends only on whether or not the second coil is powered.

It is also possible to arrange for the tool to comprise a first electric power supply suitable for selectively supplying the first coil with electricity, and/or for it to comprise a second electric power supply suitable for selectively supplying the second coil with electricity.

BRIEF DESCRIPTION OF THE DRAWINGS

Other features and advantages of the invention will clearly emerge from the description made thereof below, as an indication and in no way limiting, with reference to the appended drawings, in which.

DETAILED DESCRIPTION

Figure 1:
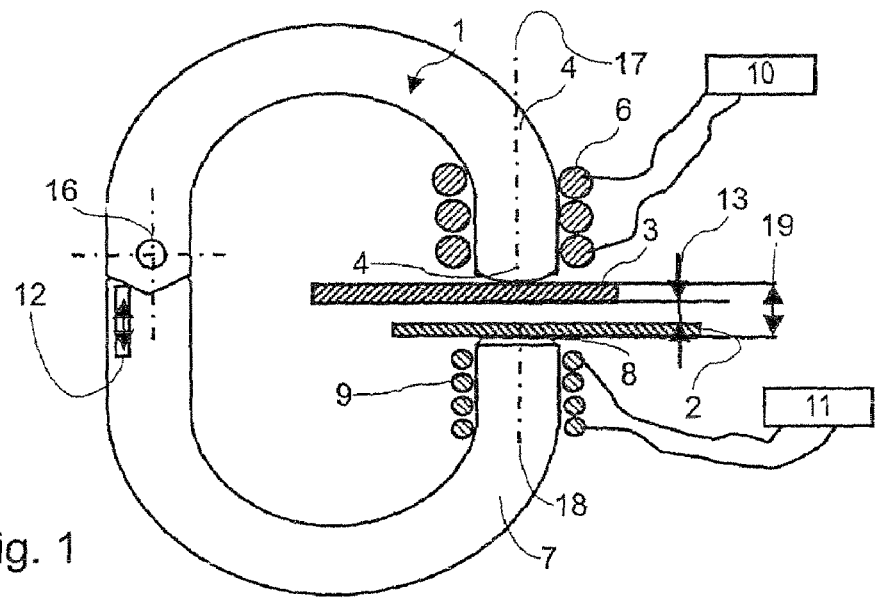
FIG. 1 represents the tool according to the invention with parts to be assembled in the form of metal plates.

As previously announced, the invention relates to an assembly tool 1 allowing a part 2 made of ferromagnetic material to be assembled with a metal part 3 made of paramagnetic material. In the examples presented, the part 2 made of ferromagnetic material is a steel plate and the metal part 3 made of paramagnetic material is an aluminum plate.

The tool 1 according to the invention is a sort of clamp consisting of first and second portions 4, 7 assembled together so as to allow a relative movement of the first and second portions in the plane of FIGS. 1 and 2a to 2d. These first and second portions 3, 7 are assembled together so as to form a clamp allowing the parts 2, 3 to be assembled to be clamped between the first and second abutments 5, 8.

The first portion 4 can be moved relative to the second 7 in the plane of FIG. 1. For this, the first and second portions can be moved about an axis 16 perpendicular to the plane of the figure so as to allow the abutments 5, 8 to be selectively moved further apart or closer together.

A first abutment 5 is formed at one end of the first portion 4, opposite a second abutment formed at one end of the second tool portion 7.

A first electromagnetic coil 6 is formed by winding a first conductor cable around the first abutment; this first abutment 5 has an axis of symmetry 17 also serving as the winding axis of the first coil 6.

A second electromagnetic coil 9 is formed by winding a second conductor cable around the second abutment 8; this second abutment 8 has a specific axis of symmetry 18 also serving as a winding axis of the second coil 9.

The axes of symmetry 17, 18 of the first and second abutments 5, 8 are substantially coaxial with one another so that the abutments are facing one another in order to allow direct contact between a part to be assembled and an abutment, without touching the coils. These contacts between the abutments and the parts are therefore substantially aligned along the axes of symmetry 17 and 18 and are therefore in the axis of the cores of the coils 6 and 9.

An immobilization means 12 is used to selectively stop the relative movement of the second abutment 8 relative to the first abutment 5 or to selectively allow this movement depending on the step of the method that is in progress.

This immobilization means 12 may be a pin or a part for attachment of the first portion relative to the second portion; this means may be actuated for example with the aid of a cylinder.

The steel plate 2, forming the part made of ferromagnetic material, is placed opposite the second abutment 8, substantially perpendicular to the axis of symmetry 18.

The aluminum plate 3, forming the part made of paramagnetic material, is placed opposite the first abutment 5, substantially perpendicular to the axis of symmetry 17.

Thanks to these abutments, the tool of the invention is particularly suitable for producing spot welds of parts in plate form. The second abutment has a slightly flat shape so as to allow flat pressing of the plate 2, whereas the first abutment has a slightly domed shape so as, on the contrary, to concentrate the electromagnetic field generated by the first coil 6 in the zone coaxial with the axes 17 and 18.

The first and second electric power supplies 10 and 11 are connected to the first and second coils 6 and 9 respectively.

The first power source must be extremely powerful (up to a million amps) because it is that which generates the electric energy for supplying the first coil which, in a very short time of a few microseconds, will propel the aluminum plate against the steel plate. The tool is dimensioned according to the thicknesses and stiffnesses of the plates or metal sheets and according to the ease of separating these plates from one another before impacting them at the end of the cores of the coils (the ends of the cores of the coils correspond to the abutments 5 and 8 of the tool 1).

The electro-magneto-dynamic parameters are adjusted in order to obtain a high level of electric energy converted into kinetic energy itself retransformed into metallurgical connection energy forming the diffusion layer linking the two metals. This welding is carried out with a surface energy density of a few kilojoules per mm².

FIGS. 2a, 2b, 2c and 2d represent the different steps in using the tool according to the invention making it possible to assemble the two plates/metal sheets 2, 3 of FIG. 1.

The two parts are placed between the abutments so that the aluminum part 3 is opposite the first abutment 5 and the core of the first coil 6 and so that the steel part 2 is opposite the second abutment 8 and consequently the core of the second coil 9.

Figures 2A, 2B, 2C, 2D:
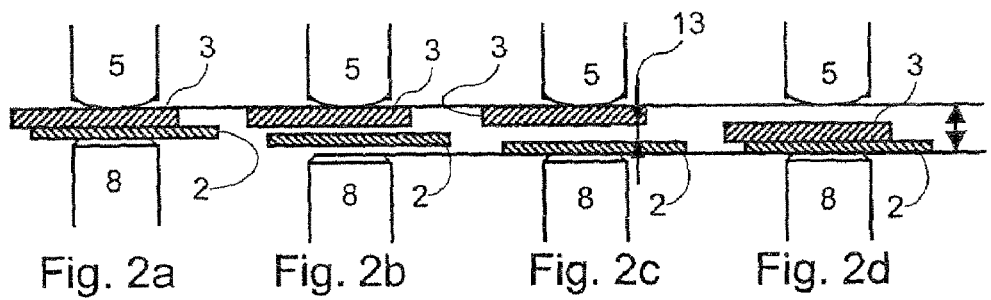
FIGS. 2a, 2b, 2c, 2d represent the four steps of applying the procedure according to the invention, these steps being carried out with the tool of the invention.

In a first step represented in FIG. 2a, the abutments are brought closer to one another in order to clamp the plates against one another between the abutments and reduce the space between the plates to zero. The space 19 between the abutments 5, 8 that corresponds substantially to the total thickness of the two plates is then measured. This measurement may be carried out by a relative position sensor of the first and second portions and this separation value 19 is stored.

In a second step represented in FIG. 2b, the second abutment is moved away so as to create a defined space 13 between the parts/plates 2, 3.

To do this, the distance separating the abutments is increased (the separation previously measured and stored) by the value of the space 13 to be created between the plates 2, 3.

By supplying the second coil 9 either at the same time as separating the second abutment 8 from the first, or after having separated the second abutment 8, the steel part 2 is attracted against the second abutment 8 and away from the aluminum part 3.

The steel part 2 is shown pressed against the second flat abutment of FIG. 2c.

Figure 3:
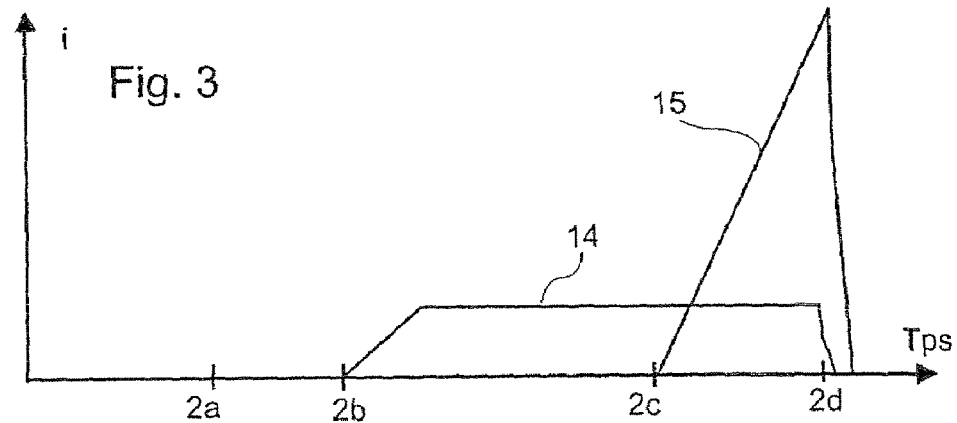
FIG. 3 represents curves 14 and 15 of electric currents over time, these curves 14, 15 correspond to the electric currents at the terminals of the first and second coils respectively.

The electric supply of the second coil 9, which makes it possible to press the steel 2 against the second abutment 8 begins shortly after the step of FIG. 2b, as can be seen in the current curve 14 of FIG. 3.

Once the separation 13 between the metal plates 2 and 3 is set (this separation is typically 1 to 2 millimeters), the first coil 6 is electrically supplied with the aid of the first power supply 10, as shown by the current curve 15 of FIG. 3. The intensity 15 increases very rapidly in a few microseconds. The aluminum plate 3 is then repelled toward the second abutment 8 and acquires a large amount of kinetic energy while traveling over the interplate space 13. The plates strike one another and the kinetic energy acquired by the aluminum part 3 creates a metallurgical bond between the parts 2, 3.

After the impact, the supply of the second coil 9 then that of the first coil 6 are disconnected; these disconnections occur after the point 2d in FIG. 3 (see curves 14 and 15).

According to a particular embodiment, the first and second portions of the tool are positionally controlled so as to allow automated operations of bringing the abutments closer together and further apart. Similarly, the supplies are controlled so that all of the steps of commanding the tool can be automated. According to one embodiment, the coils may be at a certain distance from the end of the abutments so as to help with accessibility to the abutments.

The invention claimed is:

1. An assembly method, comprising:
   placing a part made of ferromagnetic material and a part made of paramagnetic metal material between first and second abutments;
   then, bringing the first and second abutments closer together so that the part made of paramagnetic material is in contact with the first abutment and with the part made of ferromagnetic material, without the part made of paramagnetic material touching the second abutment, and so that the part made of ferromagnetic material is in contact with the second abutment and with the part made of paramagnetic material, without the part made of ferromagnetic material touching the first abutment;
   then, moving the first and second abutments further from one another and creating a determined space between the parts, the part made of ferromagnetic material being in contact against the second abutment and the part made of paramagnetic material being in contact against the first abutment;
   then, supplying a first coil so as to throw and impact the parts against one another, kinetic energy acquired by at least one of the parts being sufficient for the parts to remain assembled together after the impact.

2. The method as claimed in claim 1, wherein the paramagnetic material is aluminum and the ferromagnetic material is steel.

3. The method as claimed in claim 1, wherein, after the brining the first and second abutments closer together and before the supplying the first coil, a second coil is supplied for attracting the part made of ferromagnetic material toward the second abutment when the part made of ferromagnetic material is placed between the first and second abutments.

4. An assembly system, comprising:
   a part made of ferromagnetic material;
   a part made of paramagnetic material; and
   a tool for assembling the part made of ferromagnetic material with the part made of paramagnetic metal material, the tool comprising:
   a first tool portion including a first abutment and a first electromagnetic coil, and
   a second portion including a second abutment, the second portion being mechanically assembled to the first portion such that the first and second abutments can be brought closer to one another or moved further apart from one another selectively,
   wherein the first electromagnetic coil is configured to generate an electromagnetic flux such that the part made of paramagnetic material is repelled toward the second abutment and/or that the part made of ferromagnetic material is attracted toward the first abutment, when the first and/or second part is placed between the first and second abutments.

5. The assembly system as claimed in claim 4, wherein the first and second abutments are made of forged steel.

6. The assembly system as claimed in claim 4, wherein the paramagnetic material is aluminum and the ferromagnetic material is steel.

7. The assembly system as claimed in claim 4, wherein the second portion comprises magnetization means for attracting the part made of ferromagnetic material toward the second abutment when the part made of ferromagnetic material is placed between the first and second abutments.

8. The assembly system as claimed in claim 7, wherein the magnetization means includes a second electromagnetic coil.

9. The assembly system as claimed in claim 4, further comprising a first electric power supply configured to selectively supply the first coil with electricity.

10. The assembly system as claimed in claim 8, further comprising a second electric power supply configured to selectively supply the second coil with electricity.

11. The assembly system as claimed in claim 4, further comprising an immobilization means for selectively blocking relative movement of the second abutment relative to the first abutment.

12. The assembly system as claimed in claim 4, wherein the first and second portions are assembled together so as to form a pincer configured to clamp the parts between the first and second abutments.

* * * * *